(12) United States Patent
Trombley et al.

(10) Patent No.: US 9,744,972 B2
(45) Date of Patent: Aug. 29, 2017

(54) TRAILER BACKUP AID SPEED LIMITING VIA BRAKING

(71) Applicant: Ford Global Technologies, LLC, Dearborn, MI (US)

(72) Inventors: Roger Arnold Trombley, Ann Arbor, MI (US); Thomas Edward Pilutti, Ann Arbor, MI (US); Nathaniel Abram Rolfes, Oak Park, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/682,204

(22) Filed: Apr. 9, 2015

(65) Prior Publication Data

US 2016/0297476 A1    Oct. 13, 2016

(51) Int. Cl.

| | |
|---|---|
| *B60T 7/20* | (2006.01) |
| *B60W 40/13* | (2012.01) |
| *B60T 8/17* | (2006.01) |
| *B60W 30/18* | (2012.01) |
| *B60W 40/06* | (2012.01) |
| *B60T 13/66* | (2006.01) |
| *B60T 8/24* | (2006.01) |

(52) U.S. Cl.
CPC .............. *B60W 40/13* (2013.01); *B60T 7/20* (2013.01); *B60T 8/1708* (2013.01); *B60T 13/662* (2013.01); *B60W 30/18036* (2013.01); *B60W 30/18109* (2013.01); *B60W 40/06* (2013.01); *B60T 8/245* (2013.01); *B60T 2201/04* (2013.01); *B60T 2230/08* (2013.01)

(58) Field of Classification Search
CPC ....... B62D 13/06; B60T 8/1708; B60T 8/245; B60W 30/18036; B60W 40/076; B60W 40/105
USPC .......................................................... 701/48
See application file for complete search history.

(56) References Cited

U.S. PATENT DOCUMENTS

| | | |
|---|---|---|
| 3,542,390 A | 11/1970 | Fikse |
| 3,756,624 A | 9/1973 | Taylor |
| 3,860,257 A | 1/1975 | Mesly |
| 4,042,132 A | 8/1977 | Bohman et al. |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Mussa A Shaawat
*Assistant Examiner* — Nadeem Odeh
(74) *Attorney, Agent, or Firm* — Raymond Coppiellie; Price Heneveld LLP

(57) ABSTRACT

A trailer backup assist system for a vehicle reversing a trailer includes a brake system and a throttle sensor module outputting a throttle application signal. The system further includes a control module estimating a road grade beneath the trailer and outputting a brake torque request to the brake system based on the estimated road grade and the throttle application signal.

14 Claims, 5 Drawing Sheets

(56) References Cited

U.S. PATENT DOCUMENTS

| | | |
|---|---|---|
| 4,735,432 A | 4/1988 | Brown |
| 4,752,080 A | 6/1988 | Rogers |
| 4,848,499 A | 7/1989 | Martinet et al. |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,389,342 B1 | 5/2002 | Kanda |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,838,979 B2 | 1/2005 | Deng et al. |
| 6,854,557 B1 | 2/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,546,191 B2 | 6/2009 | Lin et al. |
| 7,690,737 B2 | 4/2010 | Lu |
| 7,715,953 B2 | 5/2010 | Shepard |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,139,109 B2 | 3/2012 | Schmiedel et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,500,497 B2 | 11/2016 | Lavoie et al. |
| 2001/0037164 A1 | 11/2001 | Hecker |
| 2001/0052434 A1 | 12/2001 | Ehrlich et al. |
| 2004/0222881 A1 | 11/2004 | Deng et al. |
| 2005/0096183 A1* | 5/2005 | Watanabe ............. B60K 31/04 477/182 |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0236201 A1 | 10/2005 | Spannheimer et al. |
| 2005/0236896 A1 | 10/2005 | Offerle et al. |
| 2005/0261818 A1* | 11/2005 | Brown ................ B60T 8/1766 701/70 |
| 2006/0103511 A1 | 5/2006 | Lee et al. |
| 2006/0142936 A1 | 6/2006 | Dix |
| 2006/0241844 A1* | 10/2006 | Mori ..................... B60T 8/00 701/93 |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2008/0231701 A1 | 9/2008 | Greenwood et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0039456 A1 | 2/2016 | Lavoie et al. |
| 2016/0052548 A1 | 2/2016 | Singh et al. |

(56) References Cited

U.S. PATENT DOCUMENTS

2016/0059888 A1    3/2016    Bradley et al.
2016/0129939 A1    5/2016    Singh et al.

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |

OTHER PUBLICATIONS

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

TRAILER BACKUP AID SPEED LIMITING VIA BRAKING

FIELD OF THE INVENTION

The present invention generally relates to systems for controlling vehicle parameters during vehicle guidance of a trailer, such as in a trailer backup assist system. In particular, various systems are disclosed for controlling the speed or a vehicle during use of a trailer backup assist system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer can control various vehicle systems to attempt to keep the speed of the vehicle below a limit where such systems become unreliable, particularly at preventing the trailer from converging toward a jackknife angle or the like. Further advances in such systems may be desired.

SUMMARY OF THE INVENTION

According to one aspect of the present invention, a trailer backup assist system for a vehicle reversing a trailer includes a brake system and a throttle sensor module outputting a throttle application signal. The system further includes a control module estimating a road grade beneath the trailer and outputting a brake torque request to the brake system based on the estimated road grade and the throttle application signal.

According to another aspect of the present invention, a method for assisting a vehicle reversing a trailer includes detecting a vehicle speed and outputting a brake torque request to the brake system to attempt to maintain the vehicle speed below a maximum speed. The method further includes detecting an overspeed condition and performing a dynamic control adjustment to increase the brake torque request in response to the overspeed condition.

According to another aspect of the present invention, a trailer backup assist system for a vehicle reversing a trailer includes a speed detector and a control module. The control module receives a detected speed from the speed detector and attempts to maintain a speed of the vehicle below a maximum speed using a difference between the detected speed and a target speed. The control module further lowers the target speed upon the detected vehicle speed being in excess of a threshold speed for a predetermined time interval.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
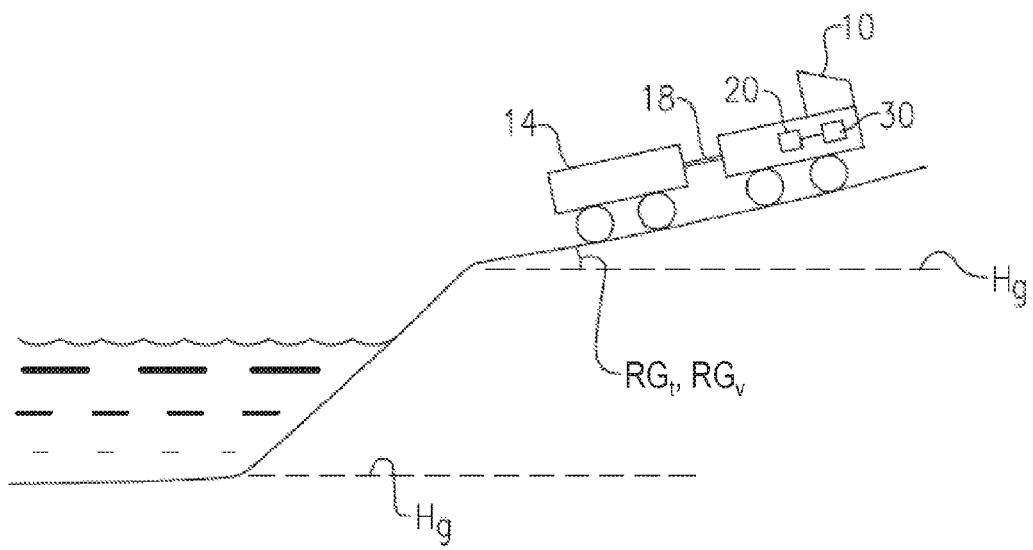
FIG. 1 is a schematic depiction of an example vehicle and trailer.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
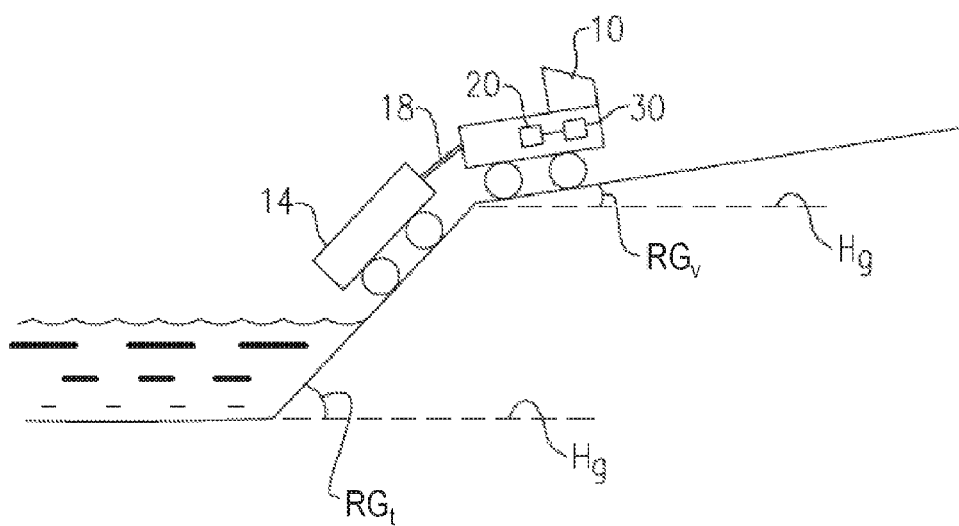
FIG. 2 is a schematic depiction of the vehicle and the trailer of FIG. 1 after reversing.
Figure 3:
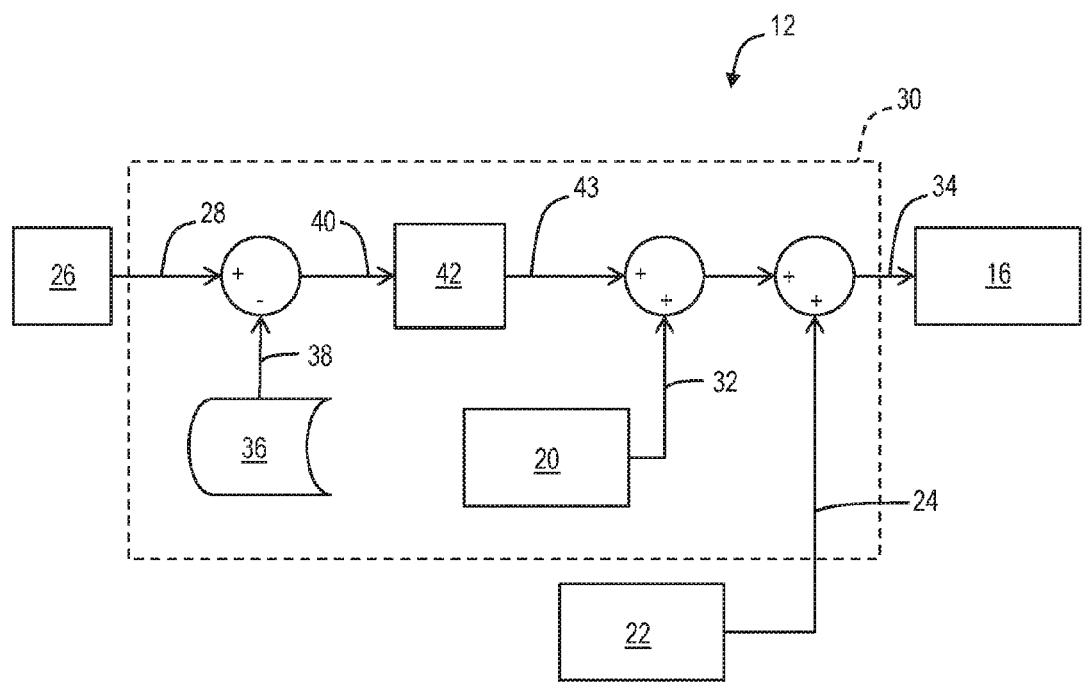
FIG. 3 is a schematic block diagram of a portion of a system for assisting the vehicle in reversing the trailer and including functionality for limiting the speed of the vehicle.

Referring to FIGS. 1-3, reference numeral 10 generally designates a vehicle that includes a system 12 for assisting vehicle 10 in backing up a trailer 14 coupled therewith. System 12 includes a brake system 16 (FIG. 3) and a throttle sensor 22 (FIG. 3) that outputs a signal 24 relating to an amount of throttle being applied. System 12 further includes a controller 30 that estimates a road grade $RG_t$ beneath the trailer 14 and outputs a brake torque request 34 to the brake system 16 based on the estimated road grade $RG_t$ and the throttle application signal 24.

Referring to FIG. 1, vehicle 10 is shown in an example scenario towing trailer 14. An arm 18 of trailer 14 extends toward and couples trailer 14 with vehicle 10 via a hitch (not shown) on the rear of vehicle 10. In this example, the vehicle 10 is reversing to move the trailer 14 from the position of FIG. 1 to the position of FIG. 2. In the example of FIGS. 1 and 2, the vehicle 10 is a truck and the trailer 14 is a boat trailer and the reversing of vehicle 10 may be so as to move trailer 14 into in a body of water at a boat lift, for example. The reversing may be carried out using system 12, which is generally configured to assist a driver of vehicle 10 in various ways in reversing vehicle 10 and trailer 14. In one example, such a trailer backup assist system 12 can includes both actions carried out by the driver of vehicle 10 as well as by system 12. In particular, the driver may initiate system 12 after driving vehicle 10 along a path to a desired location at which the reversing is to begin and placing vehicle 10 in reverse. Once system 12 is activated, the driver may, for example, select a desired vehicle curvature using an input device (such as a dedicated knob or, in some examples, the steering wheel (not shown) of vehicle 10), while simultaneously controlling the longitudinal motion (i.e. speed) of vehicle 10 using the throttle and brakes. In general, system 12 executes an operating routine to determine if the desired curvature can be safely executed, which may mean that the desired curvature will maintain the hitch angle (i.e. an angle defined between the vehicle 10 and the trailer 14 along a lateral plane at the point of coupling therebetween) below a "jackknife angle." In general, a jackknife angle is described as an angle at which a maximum steering input in either direction will fail to decrease the hitch angle. System 12 causes vehicle 10 to steer automatically, such as by control of an electronic power assisted steering ("EPAS") system, to implement either the desired curvature or a modified curvature determined to be appropriate for preventing a jackknife condition, which may be determined by controller 30.

As mentioned, while system 12 is causing vehicle 10 to automatically steer to maintain an appropriate curvature, the driver may maintain the general responsibility for controlling the longitudinal motion of vehicle 10 using the throttle and brakes. Initially, such control should causes vehicle 10 to begin rearward motion. As vehicle 10 accelerates, it may be generally the responsibility of the driver to maintain sufficient vehicle speed until a desired position is reached based on the curvature along which system 12 steers vehicle 10. Upon vehicle 10 reaching the desired location, the driver may slow vehicle 10 by reducing throttle position and applying brake torque before placing vehicle 10 in park and deactivating system 12, at which point system 12 relinquishes control of the steering system.

The speed at which vehicle 10 travels while system 12 steers, however, can affect the ability of system 12 to avoid a jackknife condition or other adverse condition. In particular, at higher vehicle speeds, the dynamics of the yaw rate of trailer 14 with respect to that of vehicle 10 and, accordingly, the hitch angle may occur at a rate that is too fast for system 12 to react to avoid a hitch angle increase to or beyond a jackknife angle, as explained above. Accordingly, it may be desirable for system 12 to be able to determine if the speed of vehicle 10 is at or is approaching a threshold at which system 12 may be unable to reliably control the hitch angle and to act to slow vehicle 10, if necessary. Further, it is noted that an EPAS system may only function to control the steering of vehicle 10 while vehicle 10 is traveling below a cutoff speed. Conversely, it may also be useful for system 12 to allow the driver to utilize as much of the speed band as possible for purposes of flexibility and sense of control.

Accordingly, systems such as system 12 can include the ability within controller 30 to limit the speed of vehicle 10 by automatically applying the brakes, via an input to the vehicle brake system 16. A controller 30 can be configured for speed limiting by the incorporation of a proportional-integral-derivative ("PID") controller 42 to monitor the difference between the vehicle speed and the target speed (such difference being designated a speed error) to request a brake torque request that will be sent to the brake system 16. This brake system 16 in turn applies the brakes appropriately, which alters the vehicle speed and the speed error 40. For the purposes of speed limiting within a system such as system 12, the desired response is a system that quickly limits the vehicle speed to the target speed with very little overshoot. It is noted that minimizing overshoot overall, as opposed to simply reducing overshoot quickly is desired, as the vehicle speed is desirably maintained below the EPAS cutout speed, for example, at all times, but flexibility through increased speed availability may also be desired. Accordingly, system 12 is configured to adjust to the outside disturbances of road grade and throttle apply, which may be the most likely disturbances to significantly affect system 12 and the overall speed of vehicle 10.

It is for this reason that system 12 uses feed forward tables based on a road grade estimate 32 and the amount of throttle applied ("throttle apply") to increase the robustness of the speed limiting controller for use in system 12, as shown in FIG. 3. In particular, system 12 is configured such that controller 30 receives a vehicle speed input 28 from speed detector 26, which is compared with a vehicle target speed 38, which may be stored in memory 36, to arrive at a speed error signal 40, which is input into PID controller 42 to arrive at an initial brake torque request signal 43. Simultaneously, system 12 can, using sensor assembly 20 (and possibly various other inputs, as described further below) estimate the road grade $RG_t$ below trailer 14 to determine if additional brake torque is desirable. In general, such additional torque can be added to the initial brake torque demand signal 43 to compensate for an additional load on vehicle 10 by trailer 14 being on an increased road grade (i.e. an additional disturbance). An additional torque demand can be correlated with variation in road grade $RG_t$ in feed forward tables stored in memory within controller 30 and can vary with trailer 14 weight, brake system 16 parameters, desired response characteristics of system 12 and the like.

Still further, controller 30 can receive a throttle apply input 24 from throttle sensor 22 and can determine a desired additional brake torque demand corresponding to an amount of disturbance (if any) affecting system 12 due to an increased throttle application by the driver. An additional brake torque demand can be correlated with variation in throttle in another feed forward table stored in memory 36 within controller 30 and can vary with engine characteristics, engine control settings, desired response characteristics of system 12, and the like. The feed forward gain added to the initial brake torque demand 43 can result in a modified brake torque request 34 that can be output from controller 30 to brake system 16 to slow vehicle 10 appropriately.

Figure 4:
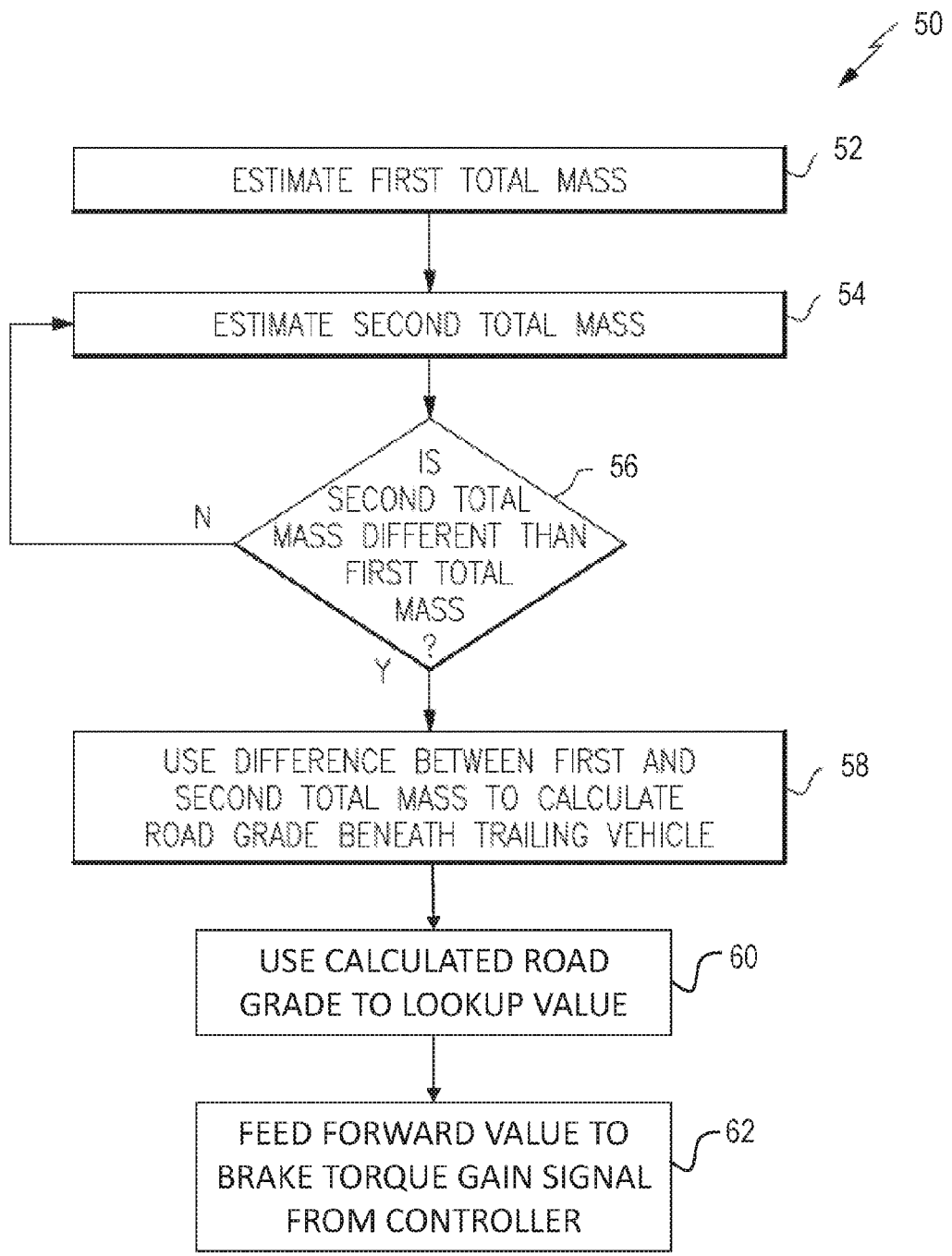
FIG. 4 is a flowchart showing a method for limiting the speed of the vehicle, including by determining a road grade beneath the trailer of FIGS. 1 and 2.

Referring to FIG. 4, a method 50 for controlling the speed of vehicle 10 using the system 12, is described, along with example steps by which controller 30 can estimate the road grade $RG_t$ beneath trailer 14. For a given vehicle towed, its associated road grade is, generally, a grade (or slope) of an area beneath the vehicle. Road grade can be expressed as a percentage of variation from a horizontal (zero) grade Hg. A road grade $RG_t$ beneath vehicle 10 vehicle is a grade of an area of the road beneath vehicle 10. A trailer road grade $RG_t$ is a grade of a road beneath the trailer 14. In the example of FIGS. 1 and 2, the trailer road grade $RG_t$ and the vehicle road grade $RG_t$ are the same in FIG. 1 and different in FIG. 2. In FIG. 2, the trailer road grade $RG_t$ is greater than the vehicle road grade $RG_t$.

As discussed above, vehicle 10 includes a sensor assembly 20 that monitors the vehicle road grade $RG_t$. The assembly may include accelerometers, wheel speed sensors, and the like, that may monitor the vehicle road grade $RG_t$ according to known methods. The vehicle 10 further includes controller 30 coupled to the sensor assembly 20. The controller 30 is a specialized controller and includes programming to estimate the trailer road grade $RG_t$ based, in part, on the vehicle road grade $RG_t$. The controller 30 and sensor assembly 20 together provide a trailer road grade assembly or system 12 for controlling the trailer 14. Although described as road grade, it is to be understood that a traditional road is not required for there to be a road grade. Road grade refers generally to the area underneath a vehicle 10 whether that area is a road or that area is an off-road.

With continuing reference to FIG. 4, an example trailer road grade estimating and speed control method 50 includes the step 52 of estimating a first total mass of vehicle 10 and trailer 14. The step 52, thus, establishes a reference total mass. Notably, road grade $RG_t$ beneath the trailer 14 is one of the variables used to estimate the total mass. In this example, changes in the total mass are attributed to changes in the road grade $RG_t$ beneath the trailer 14 relative to the road grade $RG_t$ beneath vehicle 10. Subsequently, at a step 54, the method 50 estimates a second total mass of vehicle 10 and trailer 14. The step 54 occurs after movement in a reverse direction of the trailer 14 such as from a first position (e.g. as shown in FIG. 1) to a second, different position (e.g. as shown in FIG. 2). At a step 56, the method 50 calculates whether the first total mass is different than the second total mass. If no, the method 50 returns to the step 54 and estimates another second total mass after more movement of the trailer 14.

If the second total mass is different than the first total mass, the method 50 moves to step 58. At step 58 the difference between the first total mass and the second total mass are used to calculate the road grade beneath the trailer 14. The method 50 may then correlate the road grade $RG_t$ beneath trailer 14 with an additional brake torque demand in step 60 before feeding such additional brake torque demand to an initial brake torque demand 43 from PID controller 42 in step 62, which may be effective to adjust the response of system 12 to an overspeed condition, such as by automatically applying additional braking force that that which would otherwise be demanded by controller 30. As discussed above, the method 50 can also feed forward values based on torque apply to a brake torque demand from PID controller 42 to further adjust the final brake torque demanded by controller 30.

In a more specific example of the method 50, the step 52 includes estimating the total mass of the vehicle 10 and the trailer 14 using the equation:

$$M_c = \frac{T_{pt} - T_{brk}}{R_w a_x^s},$$

where:
$M_c$ represents the total unit mass of the vehicle 10 added to the total mass of the trailer 14;
$R_w$ represents the wheel radius;
$a_x^s$ represents an acceleration output from an accelerometer;
$T_{pt}$ represents a torque output from a powertrain of the vehicle 10; and
$T_{brk}$ represents a braking force output from a frictional brake of the vehicle 10, the trailer 14, or both.

The above equation may be utilized to calculate total mass when, for example, the vehicle 10 and trailer 14 are moving forward. If the vehicle 10 and the trailer 14 stray from forward movements and, for example, begin to reverse, the example method 50 uses an alternative formula to instantaneously estimate mass of the vehicle 10 and the trailer 14. The equation below shows an example formula that demonstrates relationships between variables when the vehicle 10 and the trailer 14 are reversing:

$$\tilde{M}_c = M_c + m_{tlr} g \frac{(\sin\alpha_{r2} - \sin\alpha_{r1})}{a_x^s} = \frac{T_{pt} - T_{brk}}{R_w a_x^s},$$

where:
$\tilde{M}_c$ is the instantaneously estimated mass for the vehicle 10 plus the trailer 14;
$\alpha_{r1}$ is a road grade under the vehicle 10;
g represents the gravity of earth; and
$\alpha_{r2}$ is the road grade under the trailer 14.
Changes in the instantaneously estimated mass $\tilde{M}_c$ as the vehicle 10 and the trailer 14 reverse are used to determine the grade $\alpha_{r2}$ under the trailer 14. To derive the grade $\alpha_{r2}$ under the trailer 14, the changes in the instantaneously estimated mass are determined using the equation:

$$RG_{load}^+ = m_{tlr} g(\sin\alpha_{r2} - \sin\alpha_{r1}) = (\tilde{M}_c - M_c)a_x^s,$$

where $RG_{load}^+$ represents changes in load due to changes in road grade beneath the vehicle 10 relative to the trailer 14.

The estimated road grade $\alpha_{r2}$ beneath the trailer 14, is then determined using the equation:

$$\alpha_{r2} = \arcsin\left[\frac{(\tilde{M}_c - M_c)a_x^s}{(M_c - m_{trk}^*)g} + \sin\alpha_{r1}\right],$$

where $m_{trk}^*$ is an estimated mass of the vehicle 10.
The mass of the vehicle 10 may be determined by weighing the vehicle 10 or through some other technique, for example. A first technique uses a constant value of the truck curb weight as $m_{trk}^*$. Such a nominal value may be evaluated during or after assembling the vehicle 10 at a factory and may be based on the standard truck loading condition. In such an example, $m_{trk}^*$ would remain constant. In a second example technique, $m_{trk}^*$ may be an estimated mass based on the vehicle 10 mass for a specific trip. This is useful when, for example, the vehicle 10 is periodically heavily loaded with cargo. This second technique may provide a better estimate than the constant of the first technique. The mass of the vehicle 10 for the second example technique may be obtained using many different methods. An example is to estimate mass of the vehicle 10 using active suspension sensor. Deflection of the active suspension sensor at a steady state tells the load variation on truck unit. The estimated truck unit mass $m_{trk}^*$ in such an example will be the truck curb weight plus the indicated load weight from the suspension deflection.

In some examples, the estimated road grade can be used to calculate a total road grade torque exerted on the vehicle 10. This total road grade torque, represented as $\tau_{rgl}$, can be calculated using the equation:

$$\tau_{rgr} = (M_c - m_{trk}^*)g \sin\alpha_{r2} + m_{trk}^* g \sin\alpha_{r1}.$$

The total road grade torque can, as described above, be used as a feedforward to derive a compensating torque to control the backup speed of the trailer 14 during an automatic backup procedure. As also mentioned previously, additional feedforward compensating torque for backup speed control can also be provided by the torque apply signal 24.

Figure 5:
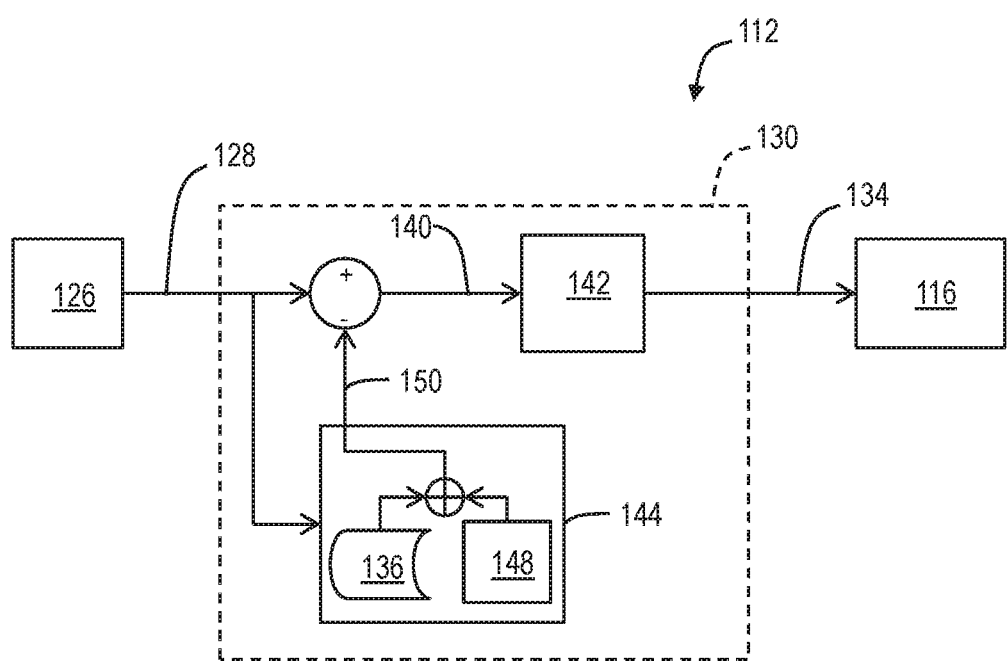
FIG. 5 is a schematic block diagram of a portion of an alternative system for assisting the vehicle in reversing the trailer and including functionality for limiting the speed of the vehicle.

With respect to FIG. 5, another embodiment of a system 112 including a controller 130 for assisting in maintaining the speed of vehicle 10 below at maximum level when reversing a trailer 14, including under various forms of automated assistance from system 112, is described. In particular, controller 130 operates using a PID controller 142 in a manner similar to that described above with respect to FIG. 3, where PID controller 142 provides a brake torque request 134 to brake system 116 to attempt to slow vehicle 10 to reduce an error signal 140 between a detected speed 128 and a target speed 150. However, controller 130 can employ a dynamic adjustment of the vehicle speed error to adjust the controller for steady state error or variation in overshoot. Such a controller 130 can be used in a vehicle 10 that is not configured for providing an estimate for the road grade below trailer 14 or can be incorporated into the above described system 12 to provide for robust overshoot control in a condition where a road grade estimate is not available (such as when the associated system has not yet accumulated enough data to implement the above equations or the like).

System 112, in particular, dynamically adjusts the target vehicle speed to force the controller to come back to the desired steady state speed based on the effect the adjustment on the target speed has on the speed error 140. In particular controller 130 includes the ability, illustrated in module 144 to receive as input the vehicle speed 128 from speed detector 126, which can be compared against a predetermined condition in the form of an initial (non-adjusted) target speed plus a predetermined maximum allowable error (which may be referred to as a "threshold speed"). Module 144 can then determine if the vehicle speed plus the maximum error is less than the non-adjusted target speed plus the maximum error. If such a condition is present, module 144 can maintain a "NoAdj" mode, in which the non-adjusted target speed is output from memory 136 for use in the error calculation for output of the error 140 to PID controller 142. If module 144 determines that the current speed 128 plus the maximum error is greater than the target speed plus the maximum error, an adjusted (lowered) target speed can be substituted for the predetermined target speed in determining the error 140 provided to PID controller 142. A dynamically lowered error 140 increases the brake torque request 134 output by controller 142, which forces system 112 to lower the speed of vehicle 10 faster than it would using the non-adjusted target speed.

Figure 6:
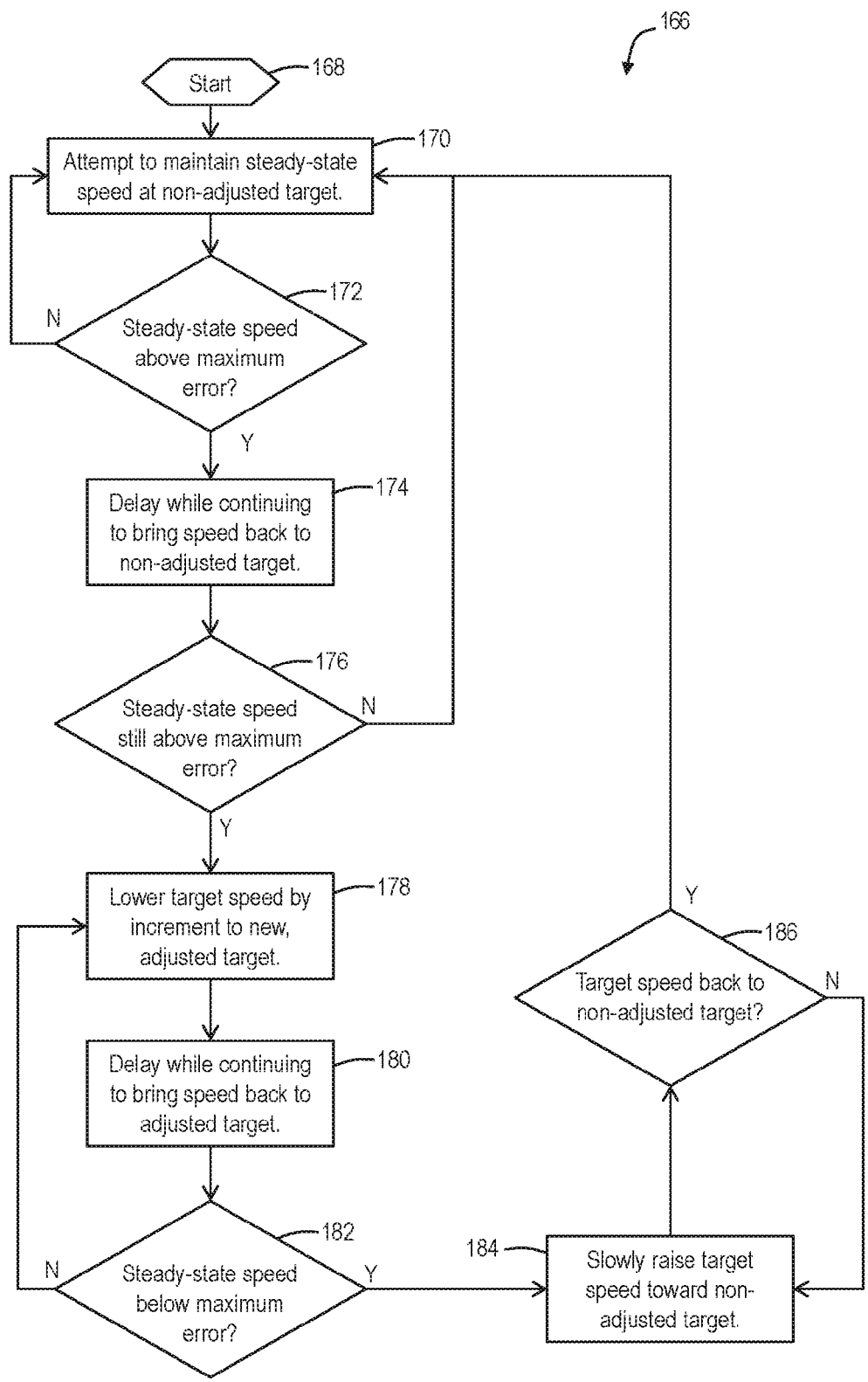
FIG. 6 is a flowchart showing an alternative method for limiting the speed of the vehicle, including by dynamically adjusting a target speed of the system.

FIG. 6 illustrates a method 166 by which system 112 can operate to attempt to regulate the speed of vehicle 10 during an assisted backup operation. In particular, once initiated in step 168, system 112 operates with controller 130 utilizing the actual, non-adjusted target speed to send to PID controller 142 (step 170). If, however, in step 172 module 144 determines that the detected speed 128 of vehicle 10 is greater than the target speed plus the maximum error, module 144 can cause controller 130 to transition to a "timer" state. As the maximum error may be the maximum amount of error that is desired for the steady state behavior of the controller, the timer state is used as a timeout period to ensure that the overshoot of the controller does not affect the steady state behavior by lowering the target speed in response to controllable overshoot. Accordingly the delay in step 174 may correlate with the response time of PID controller 142 or other, related parameters of system 112. If the detected speed 128 is brought back down such that the speed 128 plus the maximum error is lower than the non-adjusted target speed plus the maximum error before the delay in step 174 is over, then the system transitions back to the "NoAdj" state (step 170).

If the speed 128 is still such that speed 128 plus the maximum error is greater than the non-adjusted target speed plus the maximum error after the delay 174 is over, then the system 112 in step 176 transitions to an "Adjustment" state. In such a state, the target speed 150 that is fed into the PID controller 142 is substituted with a downward adjusted target speed 148 to pull the steady state speed back towards the actual target speed. If after another delay period (step 180) the speed is still high (as determined in step 182), the adjusted target speed 148 will be adjusted downward again (step 178). This will continue until the speed 128 is within the determined range, as determined in step 182.

If the speed 128 drops such that the speed plus the maximum error is below the non-adjusted target speed plus the maximum, such as when the driver is applying the brakes to slow down or the trailer 14 is no longer on a higher road grade area than vehicle 10, the system 112 transitions into a "slowrise" state 184. This state is designed to slowly raise the adjusted target speed 148 back up to the non-adjusted target speed at a controlled rate. The slow raising of the adjusted target speed 148 can help prevent undesirable behavior in the controller 130. Finally, once the adjusted target speed 148 reaches the non-adjusted target speed again, the system 112 reenters the "NoAdj" state (step 170) until system 112 is deactivated.

As mentioned previously, in an embodiment a trailer backup assist system can include the speed limiting functionality of both controller 30 and controller 130, as described above. In particular, such a system can use a PID controller 42 or 142 to apply a brake torque request to a brake system of the vehicle 10 in response to an error (the detected vehicle speed being greater than a target speed). The controller can then respond to various overspeed conditions by performing one or more dynamic adjustments. In particular, if an increase in road grade is detected, a feed-forward adjustment to the requested brake torque can be performed. Similarly, if a torque apply condition is detected, another feed-forward adjustment to the requested brake torque can be performed. If a speed in excess of a "maximum error" speed level is detected, the target speed can be dynamically adjusted. Such a system can be configured to prioritize the feed forward adjustments over target speed adjustment such that, for example, the target speed adjustment mode is only implemented if no road grade estimate is available.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A trailer backup assist system for a vehicle reversing a trailer coupled therewith, comprising:
    a vehicle brake system;
    a vehicle sensor system outputting a detected vehicle speed;
    a vehicle throttle system including a sensor outputting a throttle application signal; and
    a controller implementing a backup mode including:
        determining an initial brake torque demand based on an error between the detected vehicle speed and a threshold vehicle speed; and
        calculating an estimated grade of a surface on which the trailer is positioned and adjusting the initial brake torque demand based on the estimated grade and the throttle application signal to derive a modified brake torque demand that is output to the brake system.

2. The trailer backup assist system of claim 1, wherein the initial brake torque demand is predetermined to maintain the trailer outside a jackknife condition with respect to the vehicle.

3. The trailer backup assist system of claim 1, wherein the controller includes a proportional-integral-derivative controller that outputs the initial brake torque demand.

4. The trailer backup assist system of claim 3, wherein the controller derives the modified brake torque demand by feeding forward respective values based on the estimated grade and the throttle application signal to the initial brake torque demand.

5. A method for assisting a vehicle reversing a trailer, comprising:
    detecting a vehicle speed;
    determining when a road grade estimate is available;
    receiving a throttle application signal from a vehicle throttle and
    implementing a backup mode including:
        determining a brake torque request based on a difference between the detected vehicle speed and a target speed, the target speed being initially set to a predetermined backing threshold speed;
        outputting the brake torque request to a vehicle brake system;
        detecting an overspeed condition relative to a predetermined backing condition;
        adjusting the target speed to below the predetermined backing threshold speed to increase the brake torque request in response to the overspeed condition; and
        calculating an estimated grade of a surface on which the trailer is positioned and adjusting the brake torque request based on the estimated grade and the throttle application signal to derive a modified brake torque request that is output to the brake system.

6. The method of claim 5, wherein outputting the brake torque request is carried out using a proportional-integral-derivative controller based on tithe difference between the detected vehicle speed and the target speed.

7. The method of claim 6, wherein:
    the overspeed condition is the vehicle speed being above the predetermined backing threshold plus a maximum error.

8. The method of claim 6, wherein:
    the overspeed condition is a determination that the vehicle speed is in excess of the predetermined backing threshold speed for a predetermined time interval.

9. The method of claim 5, further including:
    returning the target speed to the predetermined backing threshold speed in response to a detection that the vehicle speed has been lowered to below the predetermined backing threshold speed.

10. A trailer backup assist system for a vehicle reversing a trailer, comprising:
    a vehicle brake system;
    a speed detector;
    a throttle sensor module outputting a throttle application signal; and
    a controller:
        receiving a detected speed from the speed detector, determining a brake torque request based on a difference between the detected speed and a target speed, the target speed being initially set to a predetermined backing threshold speed, and outputting the brake torque request to the vehicle brake system;
        lowering the target speed upon one of the detected speed being in excess of the predetermined backing threshold speed for a predetermined time interval or the detected speed being in excess of the predetermined backing threshold speed plus a maximum error;
        implementing a road grade estimation routine with respect to a surface on which the trailer is positioned; and
        when a road grade estimate is available, providing a feed-forward adjustment to the brake torque request based on the road grade estimate and the throttle application signal, before lowering the target speed, to maintain the speed of the vehicle below the predetermined backing threshold speed.

11. The trailer backup assist system of claim 10, wherein the controller includes a proportional-integral-derivative controller that receives as input the difference between the detected speed and the target speed.

12. The trailer backup assist system of claim 10, wherein:
    the controller outputs the brake torque request to the brake system to maintain the speed of the vehicle below the predetermined backing threshold speed.

13. The trailer backup assist system of claim 10, wherein the controller raises the target speed in response to detecting that the vehicle speed has been lowered to below the predetermined backing threshold speed.

14. The trailer backup assist system of claim 10, wherein the controller further raises the target speed at a controlled rate.

* * * * *

UNITED STATES PATENT AND TRADEMARK OFFICE
CERTIFICATE OF CORRECTION

Page 1 of 1

PATENT NO. : 9,744,972 B2
APPLICATION NO. : 14/682204
DATED : August 29, 2017
INVENTOR(S) : Trombley et al.

It is certified that error appears in the above-identified patent and that said Letters Patent is hereby corrected as shown below:

In the Claims

Column 10
Claim 6, Line 8:
"tithe" should be --the--.
Claim 14, Line 62:
"claim 10" should be --claim 13--.

Signed and Sealed this
Fifth Day of December, 2017

Joseph Matal
*Performing the Functions and Duties of the
Under Secretary of Commerce for Intellectual Property and
Director of the United States Patent and Trademark Office*